Oct. 4, 1927.
W. D. CHRISTENSEN
1,644,237
ELECTRIC ARC WELDING TOOL
Filed June 29, 1925
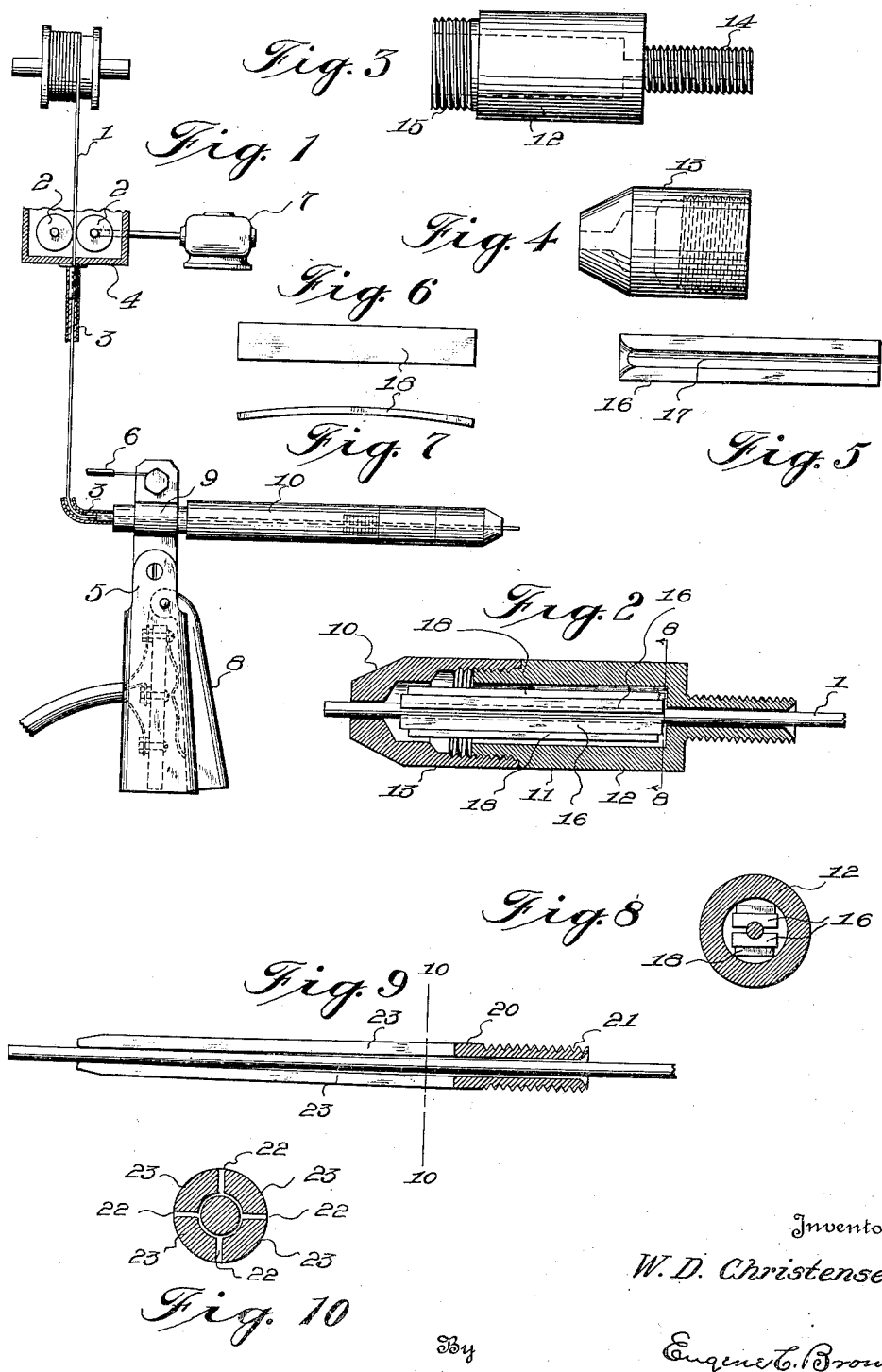

Patented Oct. 4, 1927.

1,644,237

UNITED STATES PATENT OFFICE.

WALTER D. CHRISTENSEN, OF PUEBLO, COLORADO.

ELECTRIC-ARC-WELDING TOOL.

Application filed June 29, 1925. Serial No. 40,402.

This invention relates to the art of electric arc welding, and more particularly to the electrode chuck or holder through which the travelling electrode is fed to the work.

An object of the invention is to provide an improved chuck or holder that will insure reliable contact with the travelling electrode;

A further object is to provide replaceable resilient contact jaws between or within which the travelling electrode passes, and which present an extended frictional contact surface to the travelling electrode;

A further object is to provide a light, small, compact, welding tool or chuck or holder, that provides ample electric contact with the travelling electrode without overheating and sticking to the electrode, and that presents a substantially uniform frictional engagement with the electrode over a long period of time.

In the accompanying drawings,

Figure 1 illustrates the welding tool connected with a conventional system of mechanical feed for the travelling electrode;

Fig. 2 is a sectional view of the chuck shown in Fig. 1;

Figs. 3 and 4 are views of the parts of the tubular casing of the chuck;

Fig. 5 is a view in elevation of one of the frictional contact plates or jaws used within the chuck;

Figs. 6 and 7 are plan and edge views of a pair of spring plates that serve to maintain the contact plates in frictional engagement with the travelling electrode;

Fig. 8 is a view of a cross section of the chuck on the line 8—8 of Fig. 2;

Figs. 9 and 10 are views of longitudinal and transverse sections of a modified chuck made of one piece of metal, and provided with integral resilient jaws, and showing the electrode therein.

In Figure 1, a supply of metallic electrode 1, is fed by the power-driven feed-rolls 2, 2 through the flexible cable 3 which connects the casing 4 with the welding tool 5. Electric current is supplied to the welding tool 5 through the conductor 6 from any suitable source. The motor 7 is suitably controlled by regulating devices, not shown, which in turn are controlled by the operator through the manipulation of the pistol-grip switch 8 in customary manner. The grip 8 is provided with an adjustable clamp 9 which engages the chuck 10.

The chuck 10 consists of a chambered casing 11, which may be made in two or more parts, 12, 13; the part 12 being provided with a threaded end 14 by which it is attached to the clamp 9, and a threaded end 15 which engages the nozzle end 13. Within the chamber of the casing are the friction plates or jaws 16, provided with a groove or channel 17 in which the electrode 1 travels. The jaws 16 of which two are preferably used, are maintained in frictional contact with the travelling electrode 1 by means of stiff springs 18, 18, which preferably have the shape shown in Figs. 6 and 7. When assembled the springs 18 maintain the jaws 16 in uniform frictional engagement with the travelling electrode 1, providing excellent sliding electric contact.

In Figs. 9 and 10 a modified chuck is shown, consisting of a single piece of spring-tempered steel tubing 20, preferably case-hardened and provided with a screw thread 21, and with several slots 22, dividing a considerable portion of the chuck into relatively long resilient jaws or sectors 23. The resilient jaws 23 are so shaped as to frictionally engage the electrode 1 for a considerable length, thereby providing good electric contact. In use, the chuck 20 is screwed into the pistol-grip clamp 9, in place of the chuck 10.

Each of the above types of contact jaws provides a long resilient surface frictional contact parallel with the surface of the travelling electrode, the contact plates presenting sufficient resilience to engage the travelling electrode and make a good sliding electrical contact therewith.

I claim:

1. In a welding tool, a detachable chuck, co-operating jaws therein, said jaws provided with a groove, means to retain said jaws under compression toward each other, and said groove being between the approaching surfaces of the cooperating jaws.

2. In a welding tool, a detachable chuck having separable parts, cooperating jaws within said chuck providing an extended contact for an electrode therebetween, and spring members holding said jaws under compression toward each other.

In testimony whereof I affix my signature.

WALTER D. CHRISTENSEN.